March 19, 1935.  H. R. McMAHON  1,994,918
BUMPER
Filed July 30, 1932  3 Sheets-Sheet 1
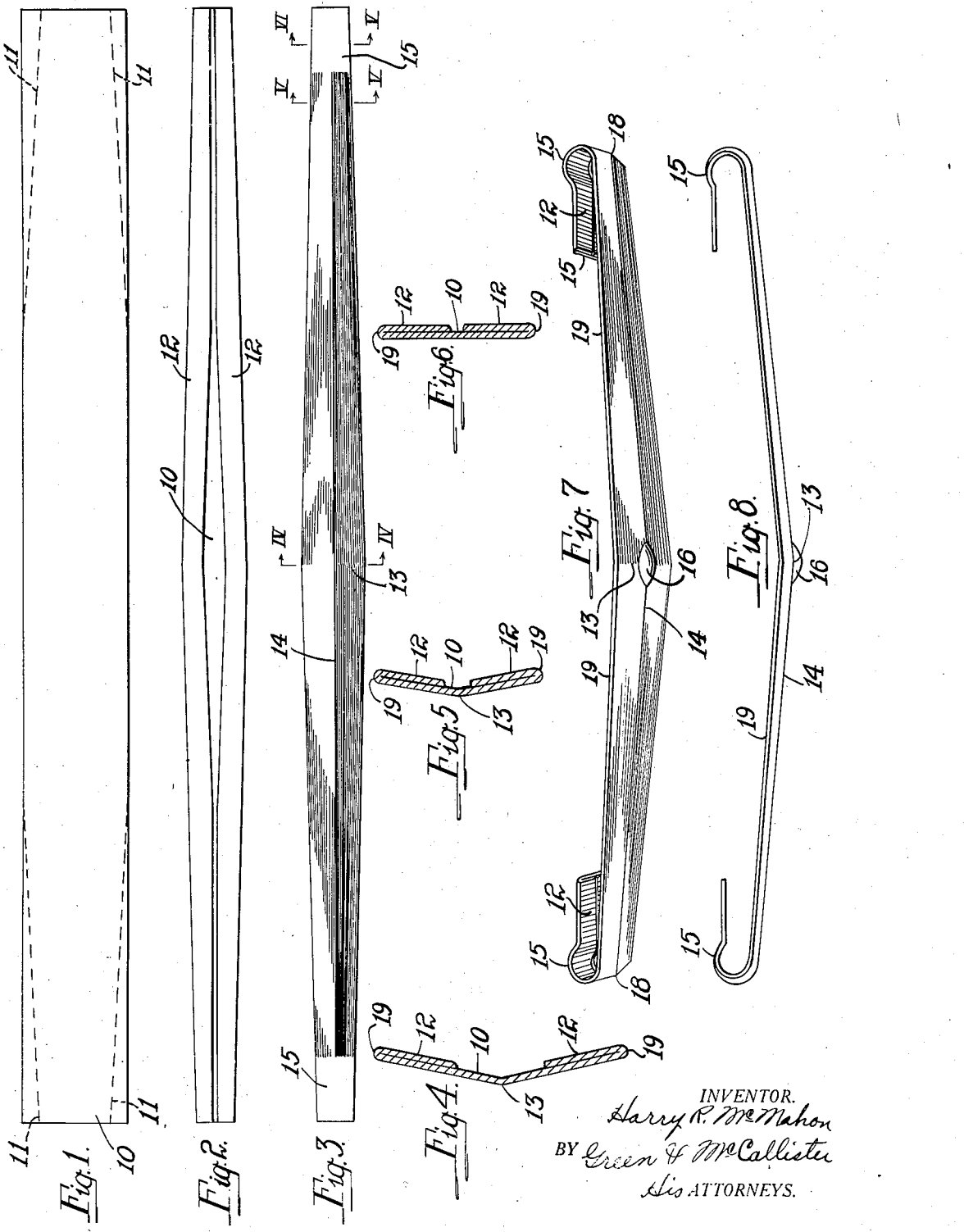
INVENTOR.
Harry R. McMahon
BY Green H McCallister
His ATTORNEYS.

March 19, 1935.  H. R. McMAHON  1,994,918
BUMPER
Filed July 30, 1932   3 Sheets-Sheet 2
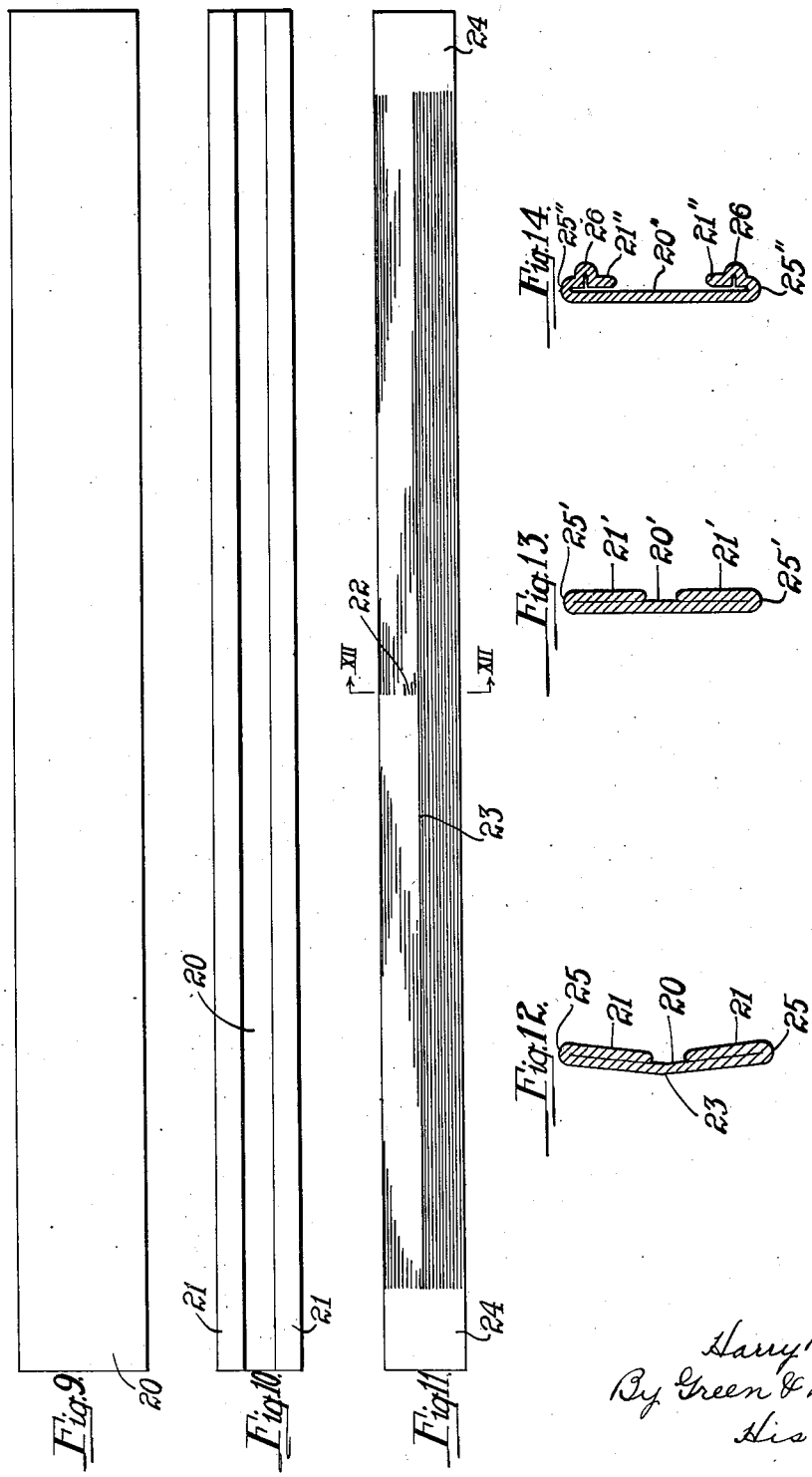
INVENTOR
Harry R. McMahon
By Green & McCallister
His Attorneys

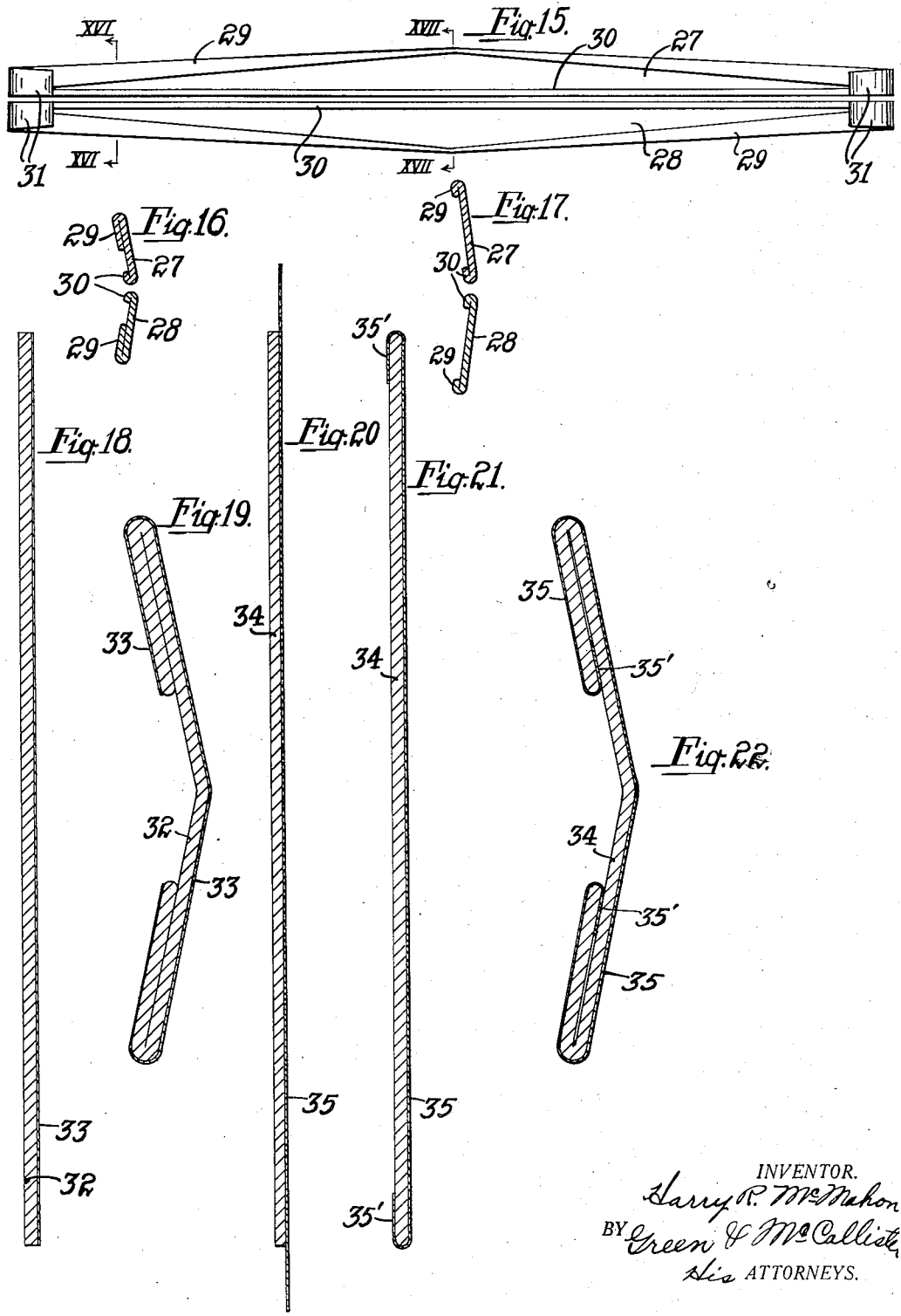

Patented Mar. 19, 1935

1,994,918

UNITED STATES PATENT OFFICE 1,994,918

BUMPER

Harry R. McMahon, Coraopolis, Pa., assignor to Standard Steel Spring Company, a corporation of Pennsylvania Application July 30, 1932, Serial No. 626,345

7 Claims. (Cl. 293—55)

This invention relates to vehicle bumpers and more particularly to impact bars for such bumpers as well as to a method of manufacturing said bars.

At the present time it is almost universal practice to have the front faces as well as the top and bottom edges of vehicle bumper impact bars highly polished, and this whether such bars enter into the make-up of single bar or multiple bar bumpers.

There is a marked tendency toward tapered impact bars, that is, bars that are tapered longitudinally in height from the center toward the ends thereof.

At the present time most bumper impact bars are chromium plated, but chromium plating while admirably suited for other parts of automotive vehicles is not suited for bumper impact bars since these are subject to sand scouring and abrasion and are also subject to deterioration due to various materials which are projected thereonto from passing vehicles.

For some time various vehicle bumper manufacturers have attempted to make bumper impact bars from what is known as duplex metal, that is, material rolled down from a starting piece having a steel backing with preferably a stainless or rustless facing portion welded thereto and constituting an integral part thereof.

Attempts have also been made to sheath bumper impact bars with a relatively thin sheath of stainless or rustless material.

Tapered bumper impact bars have not gone into general use because of their high cost and this high cost has been primarily occasioned by the edge finishing operations necessary.

Duplex metal bars have not gone into general use for two reasons so far as I am aware. In duplex metal bars in which the rustless or stainless metal is only applied to one face of the base bar the edge finishing of the bumper impact bar has rendered the same wholly uncommercial and where the stainless or rustless facing completely surrounds the base bar the cost has been prohibitive.

Where attempts have been made to sheath the base bar with rustless or stainless metal, the problem of securing the sheathing to the base bar in such manner that the sheathing contacts with the base bar at all points and is prevented from separating therefrom, has presented a problem which so far as I am aware has not been solved prior to this invention.

An object of this invention is to produce a vehicle bumper impact bar of such type that the top and bottom edges thereof can be cheaply and easily finished.

A further object is to produce a vehicle bumper impact bar which lends itself to tapered contour and which will still have smooth top and bottom edges requiring no grinding but which may be readily polished by means of the ordinary polishing machines.

A still further object of this invention is to produce a duplex metal vehicle bumper impact bar in which the front face as well as the top and bottom edges are completely covered with stainless or rustless metal forming one face of the starting piece from which the base bar is made.

A still further and more limited object of this invention is to produce a sheathed vehicle bumper impact bar in which the longitudinal joints between the base bar and the sheathing are completely protected and hidden from view.

A still further object is to provide a method whereby bumper bars provided with smooth top and bottom edges suitable for polishing and plating without grinding may be produced and this whether such bars are longitudinally straight from top to bottom, longitudinally tapered from top to bottom or otherwise configured.

A still further and more limited object is to provide a method whereby vehicle bumper impact bars having double thickness marginal portions yet having smooth top and bottom edges which require no grinding may be produced cheaply.

Other and further objects will be understood by those skilled in this art.

I have illustrated the present invention in the accompanying drawings which form a part hereof and wherein:

Figure 1 illustrates a starting blank for the formation of a tapered bumper impact bar;

Fig. 2 shows the starting blank of Fig. 1 with the marginal longitudinal edges thereof folded into abutting relation with the rear surface of the starting piece;

Fig. 3 is a face view of Fig. 2 after predetermined configurations have been imparted thereto:

Fig. 4 is an enlarged section on the line IV—IV of Fig. 3;

Fig. 5 is an enlarged section on the line V—V of Fig. 3;

Fig. 6 is an enlarged section on the line VI—VI of Fig. 3;

Fig. 7 illustrates in perspective the bumper impact bar of Fig. 3 with the ends bent around into one suitable construction adapted for mounting purposes together with the addition of a suitable medallion;

Fig. 8 is a plan view of the bumper impact bar of Fig. 7;

Fig. 9 is a view similar to Fig. 1 of a starting piece for a straight bumper impact bar, that is, one without a taper;

Fig. 10 is a view analogous to Fig. 2 and shows the starting piece of Fig. 9 provided with marginal longitudinal folds to make a straight bar;

Fig. 11 is a face view of Fig. 10 after predetermined curvatures have been imparted thereto;

Fig. 12 is an enlarged sectional view taken on the line XII—XII of Fig. 11;

Fig. 13 is an enlarged sectional view similar to Fig. 12 through a modified form of bar;

Fig. 14 is an enlarged sectional view analogous to Fig. 13 but wherein the marginal folds are distorted;

Fig. 15 is a rear view of a double bumper impact bar wherein each part is made according to and as a combination of Figs. 2 and 10, that is, each part has one straight edge and one tapered edge;

Fig. 16 is an enlarged cross-sectional view on the line XVI—XVI of Fig. 15;

Fig. 17 is a cross-sectional view on line XVII—XVII of Fig. 15;

Fig. 18 is a sectional view through a duplex metal starting piece wherein a rustless alloy forms a relatively thin part of the duplex or compound stock;

Fig. 19 represents an enlarged cross-section through a bumper analogous to Fig. 4 wherein the duplex or compound starting piece of Fig. 18 has been utilized;

Figs. 20, 21 and 22 illustrate the steps used in finishing a bumper impact bar with a sheet of rustless alloy;

Similar numerals indicate corresponding parts throughout the various views of the drawings.

Referring first to Figs. 1 to 8, inclusive, I prepare a suitable starting piece 10 of generally rectangular shape and of the desired length, width and thickness. This starting piece 10 is of the proper length but of a greater width than the ultimate bar to be fashioned therefrom. For example, I may start with a piece 10 which is about eight inches wide and about eighty-four inches long, the thickness being preferably less than the spring steel stock used for bumpers.

Inasmuch as in Figs. 1 to 8, inclusive, I illustrate the production of a tapered bumper impact bar, I preferably trim off the starting piece 10 as indicated by the dotted lines 11 in Fig. 1. I then fold over the longitudinal marginal edges of the trimmed starting piece forming the folds 12 abutting the rear face of the starting piece as clearly indicated in Fig. 2. The extent of folding is that amount sufficient to bring the bar to the desired ultimate width and in general the folds are less in combined width than the bar itself so that the edges of the folds are spaced apart as shown in Fig. 2, which is a view looking at the rear of the bar. It is apparent that the folds can be so made as to produce a bar which is widest at the center and which thereafter tapers off towards the ends as shown in Fig. 3 which is a face view of the bar. The precise extent of the taper can be controlled by the extent of the folds 12.

If desired, the bar may be given obtuse angled bends as indicated in Figs. 3, 4, 5, 7 and 8. These bends or configurations are indicated in the figures mentioned by the numerals 13 and 14.

As shown in Figs. 7 and 8, at any suitable stage but preferably after being otherwise shaped as above, the ends of the bar may be bent around into the loop portions 15 so that the bar can be suitably attached to the bumper mounting member in any desired manner. It is understood that these loop portions 15 are merely illustrative of one form of bend and that the ends may be otherwise bent, as into eyes or the like without departing from the invention in any manner. In general, the ends of the bar may be given any necessary or desired configuration in order to adapt the same for any given mounting scheme. Also at any suitable stage the medallion 16 may be added. Also, due to the bend about axis 14, the ends of the bar can be given new and desirable configurations as indicated at 18 and the whole bumper is most attractively provided with new effects and new highlights.

An important feature of the invention is that both the top and bottom edges 19 of said bar are provided with roll finished faces. It will be seen that the edges are composed of rounded portions which connect the bumper bar proper with the bumper contour determining folds 12 which lie entirely behind the bar proper and which have the added function of reinforcing and strengthening the bar.

Referring further to Figs. 1 to 8, inclusive, it will be seen that I provide a bumper impact bar for vehicles, wherein new and unusual appearances and configurations can be readily imparted thereto in an inexpensive and simple manner. While the bar is constructed of relatively light stock it is, due to its construction, of massive appearance and of great strength and is particularly adapted for modern motor vehicles wherein new and modernistic effects together with the appearance of massiveness and strength are so highly desired.

In Figs. 9 to 12, inclusive, I have illustrated a modified form of bumper and in the views I show the steps in the production of a bumper bar which has straight edges, that is, which is non-tapering. The rectangular starting piece 20 of Fig. 9 is similar to that (10) of Fig. 1 but in the present instance needs no preliminary trimming operation, but the excess width of the piece is folded over to provide the longitudinal marginal folds 21 which abut against the rear face of the resultant bar.

Similarly to Fig. 3, Fig. 11 illustrates the face of such a straight edged bar which has been given a bend as indicated by the transverse line 22 and a bend about its longitudinal medial axis indicated by the numeral 23. The end portions 24 of Fig. 11 are likewise plain and straight as are portions 15 of Fig. 3 and the disposition of the various portions of the bar is clearly shown by means of Fig. 12 which is enlarged for clarity. As in Figs. 1 to 8, inclusive, the modification of Figs. 9 to 12, inclusive, similarly automatically provides edges 25 requiring no grinding and which are composed of rounded portions connecting the piece 20 with the marginal folds 21 which lie entirely behind the bar proper.

If I so desire, to fulfill certain specifications, the bumper need not be given any bend at all on its longitudinal medial axis (23) but may be straight in cross-section (as may also the bumper of Figs. 1–8, inclusive) as is clearly indicated by Fig. 13 which represents just such a modification. In comparing Fig. 13 with Fig. 12, it will be apparent that the only distinction between the two is that the bar of Fig. 12 is bent as above explained whereas the bar of Fig. 13 is unbent, that is it is straight vertically. The relationship is indicated by the numerals of Fig. 12 with a (') affixed thereto.

Since such a bumper as is shown in Fig. 13 would have somewhat less impact resistance than would a bar such as shown in Fig. 12 I find that I can distort the folds 21' of Fig. 13 into some such shape as that indicated at 26 in Fig. 14, the relationship of the other parts to those of Fig. 13 being denoted by the use of the same numerals with a ('') affixed thereto. From Fig. 14 it will be understood that the folds 21' of Fig. 13 have been subjected to an intermediate distortion so that instead of producing a bumper with somewhat less strength as in Fig. 13 I actually produce a straight bumper bar which may have as much or even greater strength than the bar of Fig. 12.

It will be understood further that the folds 21'' and their distorted portions 26 have the ability to resist impacts to a much greater degree than the folds 21' of Fig. 13, for example. The folds of the various modifications need not be secured to the back of the bar proper, but will preferably be close thereto.

When it is desired to plate the bar, a suitable coating as of wax, lead, or other suitable material may be used to prevent access of pickling or plating fluid to the space under said folds.

In Figs. 15, 16 and 17 I have illustrated a double bumper impact bar composed of upper and lower bars 27 and 28. Each of these bars embodies this invention and is made in accordance with the foregoing disclosure. Briefly, each of the bars has one straight edge and one tapered edge and the tapered edge is produced by a marginal fold 29 of the nature and form understood from Fig. 2 whereas the straight edge of each bar is formed by the marginal fold 30 which is made in accordance with the teachings of Fig. 10. In other words, Fig. 15 represents an impact bar wherein procedures applicable both to Figs. 2 and 10 have been utilized.

It is clear that as to impact bars composed of three bars or even more than three, the upper and lower bars may be made in accordance with Fig. 15 whereas each of the one or more intermediate bars may be made in accordance with Fig. 10. Suitable connecting end bends 31 of eye or other desired shape may also be provided.

Various attempts have been made to manufacture bumper impact bars from duplex metal starting pieces, that is, from starting pieces having as the major portion thereof spring steel with a facing of some stainless or rustless alloy such as Allegheny metal, an alloy containing about 18% chromium and about 8% nickel with the remainder principally iron.

The duplex metal starting piece may be made in various ways; the kind of or the manner of making this starting piece does not enter into this invention.

I find that I am able to take a starting piece made from duplex metal with the facing metal covering one side only of the base and produce thereby in accordance with this invention, an impact bar for bumpers having top and bottom edges covered with the facing metal. This, so far as I know, has heretofore been considered impracticable.

In Fig. 18, the starting piece 32 is shown as made from duplex metal with a facing 33 of Allegheny metal which, as known, is an especially desirable and attractive material which is non-corrodible, extremely hard, and is capable of being highly polished.

If I so desire and as shown in Figs. 20 to 22, inclusive, I may provide a surface sheet 35 of Allegheny metal or other suitable material which is wider or of greater extent than the starting piece 34 itself as shown in Fig. 20 and this excess is folded over as shown at 35' in Fig. 21 prior to the further operations resulting in an impact bar as illustrated in Fig. 22 wherein the surfacing sheet 35 extends over the entire face of the bar proper, around the edges, over the folds, around the inner edges of said folds and part way toward the outer edges of the bar between said folds and the bar proper, thus providing an unusually efficacious construction of maximum resistance to corrosion and the like and of improved appearance.

It will be understood that the bar illustrated by the sections of Figs. 19 and 22 may also be made in accordance with the teachings of Figs. 13 and 14 hereinabove, that is, either of the bars of Figs. 19 and 22 may be provided with a vertically straight face and/or with the distorted folds illustrated in Fig. 14.

The above is intended more in an illustrative than in a limitative manner and it is clear that other and further modifications, variations, additions and omissions may be made without departing from the spirit and scope of the foregoing teachings. In particular it will be observed that I have solved the problems of producing an attractive massive appearing bar of relatively light weight and great strength and that I have further solved the problems in connection with the edge finishing of bumper bars, while at the same time solving the extremely difficult problem of providing such a bumper with a non-resistant attractive solid metal surfacing.

What I claim as new and desire to secure by Letters Patent is:—

1. An impact bar for vehicle bumpers having reinforcing marginal folds covering a substantial portion of the rear surface thereof and providing rounded edges double the thickness of the bar, said bar having a surface of non-corrodible material thereon, covering the front of the bar and the exposed surfaces of the folds and having a portion between the folds and the rear of the bar.

2. A two-bar impact bar for vehicles, each such bar having one tapered edge and one straight edge, the tapered edge having an inversely tapered longitudinal marginal fold and the straight edge having a fold parallel thereto, each such fold providing an edge which is rounded and double the thickness of the bar.

3. An impact bar for automotive bumpers characterized by the appearance of massiveness and strength but constructed of sheet metal of less strength than the conventionally used spring steel, said impact bar being comprised of a suitably configured sheet of such sheet metal and having folds on the rear surface thereof unitarily connected to said sheet via roll finished edges double the thickness of such sheet, said folds covering the major portion of the rear surface of such sheet and providing such with increased strength and rigidity, said bar having ends configured for connection to a vehicle.

4. An impact bar for automotive bumpers characterized by the appearance of massiveness and strength but constructed of sheet metal of less strength than the conventionally used spring steel, said impact bar being comprised of a suitably configured sheet of such sheet metal and having folds on the rear surface thereof unitarily connected to said sheet via roll finished edges double the thickness of such sheet, said folds covering the major portion of the rear surface of such sheet and providing such with increased strength and rigidity, said sheet, and hence said bar, being predeterminedly tapered and said folds being tapered inversely thereto, said bar having ends configured for connection to a vehicle.

5. An impact bar for automotive bumpers characterized by the appearance of massiveness and strength but constructed of sheet metal of less strength than the conventionally used spring steel, said impact bar being comprised of a suitably configured sheet of such sheet metal and having folds on the rear surface thereof unitarily connected to said sheet via roll finished edges double the thickness of such sheet, said folds covering the major portion of the rear surface of such sheet and providing such with increased strength and rigidity, said folds being provided with intermediate distorted portions.

6. An impact bar for automotive bumpers characterized by the appearance of massiveness and strength but constructed of sheet metal of less strength than the conventionally used spring steel, said impact bar being comprised of a suitably configured sheet of such sheet metal and having folds on the rear surface thereof unitarily connected to said sheet via roll finished edges double the thickness of such sheet, said folds covering the major portion of the rear surface of such sheet and providing such with increased strength and rigidity, said sheet, and hence said bar being predeterminedly tapered, said folds being tapered inversely to said sheet and being provided with intermediate distorted portions.

7. A tapered impact bar for vehicle bumpers having inversely tapered reinforcing marginal folds in substantial contact with and covering the major portion of the rear surface thereof and providing rounded edges double the thickness of the bar, the ends of which are configured for connection with a vehicle.

HARRY R. McMAHON.